United States Patent

Rapp, Jr. et al.

[11] 4,060,195
[45] Nov. 29, 1977

[54] SOLAR HEATING CONTROL SYSTEM

[75] Inventors: Felix Rapp, Jr., Marlboro; James M. Barron, Framingham, both of Mass.

[73] Assignee: DIY-Sol, Inc., Marlboro, Mass.

[21] Appl. No.: 708,872

[22] Filed: July 26, 1976

[51] Int. Cl.² ................................................. F24J 3/02
[52] U.S. Cl. ..................................... 237/1 A; 126/270; 236/91 F; 165/39
[58] Field of Search ........................ 126/270, 271, 400; 237/1 A; 236/91 F; 165/39

[56] References Cited

U.S. PATENT DOCUMENTS

| | | | |
|---|---|---|---|
| 3,902,474 | 9/1975 | Pyle | 237/1 A |
| 3,977,601 | 8/1976 | Beanzi | 237/1 A |
| 3,997,108 | 12/1976 | Mason | 237/1 A |

Primary Examiner—John J. Camby
Assistant Examiner—Henry C. Yuen
Attorney, Agent, or Firm—Joseph S. Iandiorio

[57] ABSTRACT

A control circuit for a solar heating system having a solar collector, a heating load and a heat transfer control unit, including a collector valve or damper for controlling the flow of heating fluid to and from the solar collector; a load valve or damper for controlling the flow of heating fluid to and from the heating load; a heating pump for moving the heating fluid; a heat exchanger; and a storage pump for circulating a storage fluid from a storage tank through the heat exchanger, the control circuit including a load sensor for sensing the temperature of the load; a collector sensor for sensing the temperature of the solar collector; a collector switching circuit responsive to an indication from the load sensor that the load temperature is below a preset level and from the collector sensor that the collector temperature is above a predetermined level, to open the dampers and activate the heating pump to move the heating fluid from the load to the collector to be heated and then returned to the load; a storage sensor for sensing the temperature of the storage fluid in the storage tank; a storage switching circuit responsive to an indication from the load sensor that the load temperature is below a preset level and from the storage sensor that the storage fluid temperature is above a predetermined level to open the load damper, close the collector damper, actuate the storage pump to move the storage fluid internally through the fluid and actuate the heating pump to move the heating fluid from the load externally through the heat exchanger to be heated and then returned to the load; and a differential switching circuit responsive to the storage sensor and the collector sensor, upon a preestablished minimum differential between the collector temperature and the storage fluid temperature, when the collector switching circuit and the storage switching circuit are inoperative in the absence of an indication from the load sensor, for actuating the storage pump to move the storage fluid internally through the heat exchanger, opening the collector damper, and closing the load damper, and actuating the heating pump for moving the heated fluid from the collector externally through the heat exchanger to increase the heat stored in the storage fluid and, when the storage switching circuit is operative, to open the collector damper and activate the storage pump to preheat the heating fluid coming from the load before it reaches the heat exchanger.

2 Claims, 3 Drawing Figures

SOLAR HEATING CONTROL SYSTEM

FIELD OF INVENTION

This invention relates to a control system for a solar heating system including a heat transfer control unit and a control circuit, and more particularly to a control circuit which automatically utilizes heat from a collector at intermediate temperature for preheating.

BACKGROUND OF INVENTION

Most conventional solar heating systems are expensive and difficult to fabricate and install. Typically parts requiring special care and expertise in selecting as to size, capacity, and reliability are scattered through the system. In many such systems efficiency suffers when the collector is insufficiently hot to be used to heat the air or other heat transfer medium and so the air must be diverted to be heated using heat from a heat storage, such as through the use of a heat exchanger. In these instances, although the collector may not be hot enough for direct heating, it still is generating substantial heat which is being wasted.

SUMMARY OF INVENTION

It is therefore an object of this invention to provide an improved control circuit which enables normally wasted heat generated by a collector at intermediate temperatures to be used for preheating.

It is a further object of this invention to provide an improved, simple and easy-to-install control system in which all heat transfer controls and control circuits are disposed in a single assembly.

The invention results from the realization that greater efficiency can be achieved simply and inexpensively by using a differential control to apply the heat in a collector operating at intermediate temperatures to at least preheat fluid which must be further heated.

The invention features a control circuit for a solar heating system having a solar collector, a heating load, and a heat transfer control unit including a collector valve or damper for controlling the flow of heating fluid to and from the solar collector and a load valve or damper for controlling the flow of heating fluid to and from the heating load. The heat transfer control unit also includes a heating pump for moving the heating fluid, a heat exchanger, and a heat storage pump for circulating a storage fluid from a storage tank through the heat exchanger.

The control circuit includes a load sensor for sensing the temperature of the load and a collector sensor for sensing the temperature of the solar collector. There is a collector switching circuit responsive to an indication from the load circuit that the load temperature is below a preset level, and from the collector sensor that the collector temperature is above a predetermined level, to open the dampers and actuate the heating pump to move the heating fluid from the load to the collector to be heated and back, and then returned to the load. There is a storage sensor for sensing the temperature of the storage fluid in the storage tank. A storage switching circuit is responsive to an indication from the load sensor that the load temperature is below a preset level and from the storage sensor that the storage fluid temperature is above a predetermined level, to open the load damper, close the collector damper, actuate the storage pump to move the storage fluid internally through the heat exchanger, and actuate the heating pump to move the heating fluid from the load externally through the heat exchanger to be heated and then returned to the load.

The control circuit also includes a differential switching circuit responsive to the storage sensor and the collector sensor, upon a preestablished minimum differential between the collector temperature and the storage fluid temperature, when the collector switching circuit and the storage switching circuit are inoperative in the absence of an indication from the load sensor, for actuating the storage pump to move the storage fluid internally through the heat exchanger, opening the collector damper and closing the load damper, and actuating the heating pump for moving the heating fluid from the collector externally through the heat exchanger to increase the heat stored in the storage fluid. When the storage switching circuit is operative, the differential switching circuit opens the collector damper and actuates the storage pump to preheat the heating fluid coming from the load before it reaches the heat exchanger.

DISCLOSURE OF PREFERRED EMBODIMENT

Other objects, features and advantages will occur from the following description of a preferred embodiment and the accompanying drawings, in which.

Figure 1:
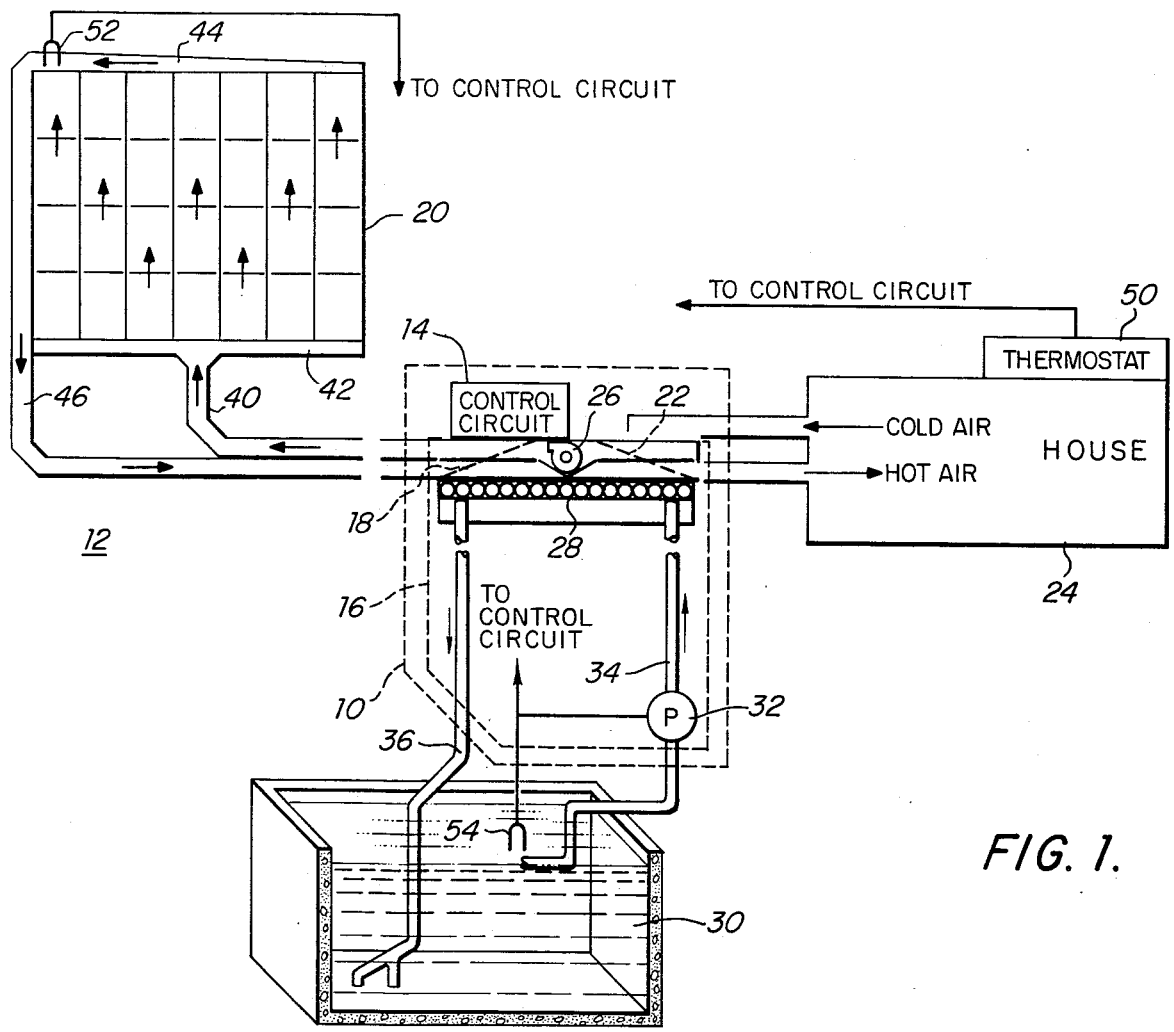
FIG. 1 is a schematic diagram of a solar heating system having a control system including a heat transfer control unit and a control circuit according to this invention.

There is shown in FIG. 1 a solar heating control system 10 located as a part of a solar heating system 12. Solar heating control system 10 includes a control circuit 14 and a heat transfer control unit 16. Heat transfer control unit 16 includes a collector valve or damper 18 for controlling air flow to and from solar collector 20 and a load valve or damper 22 for controlling air flow to and from the heating load or house 24. Heat transfer control unit 16 also includes a blower 26 if the medium to be used for heat transfer between the solar collector 20 and the load 24 is air or some similar gaseous substance. If the fluid used is a liquid, other types of pumps may be used. Heat transfer control unit 16 also includes a heat exchanger 28 which is fed with the storage fluid, typically water stored in storage tank 30, under the control of storage pump 32 which feeds water into heat exchanger 28 via pipe 34 and returns it to storage tank 30 via pipe 36.

In operation, cold air from house 24 moves through cold air duct 40 and into manifold 42 of solar collector 20, from whence it is distributed through solar collector 20, where it is heated and subsequently collected in the hot air manifold 44, which delivers the heated air through hot air duct 46 that returns to the heat transfer control unit 16. Here the hot air may be directed back to house 24 if the load temperature sensor or house thermostat 50 has indicated to control circuit 14 that it requires heat. If not, the heat will be directed through heat exchanger 28 which, by means of the water circulator pump 32, will be used to increase the heat stored in storage tank 30. If house thermostat 50 indicates that the house requires more heat, but the collector heat sensor 52 indicates to the control circuit 14 that the collector has not reached its predetermined temperature, then air from the house is circulated through the heat exchanger 28 and not through the collector 20 before it is returned to heat house 24.

If the collector, although not having reached its predetermined minimum level for operation, has nevertheless reached a preestablished temperature level above that of the water in storage tank 30, as indicated by storage sensor 54, then the cold air from house 24 may be first directed to solar collector 20 to be preheated there before it is submitted to heat exchanger 28 for the final heat increase before being returned to house 24. In the absence of request from thermostat 50 for heat for house 24, and upon a predetermined differential existing between the temperature sensed by sensor 52 and sensor 54, blower 26 will be turned on to drive hot air from solar collector 20 into heat exchanger 28 while pump 32 is running, to thereby increase the heat stored in storage tank 30. In the discussion of FIG. 1 and in the subsequent discussions in FIGS. 2 and 3, the storage medium is referred to as water and the heating fluid is air in this specific embodiment. However, various other fluids, gaseous and liquid, may be used in place of either of them.

Figure 2:
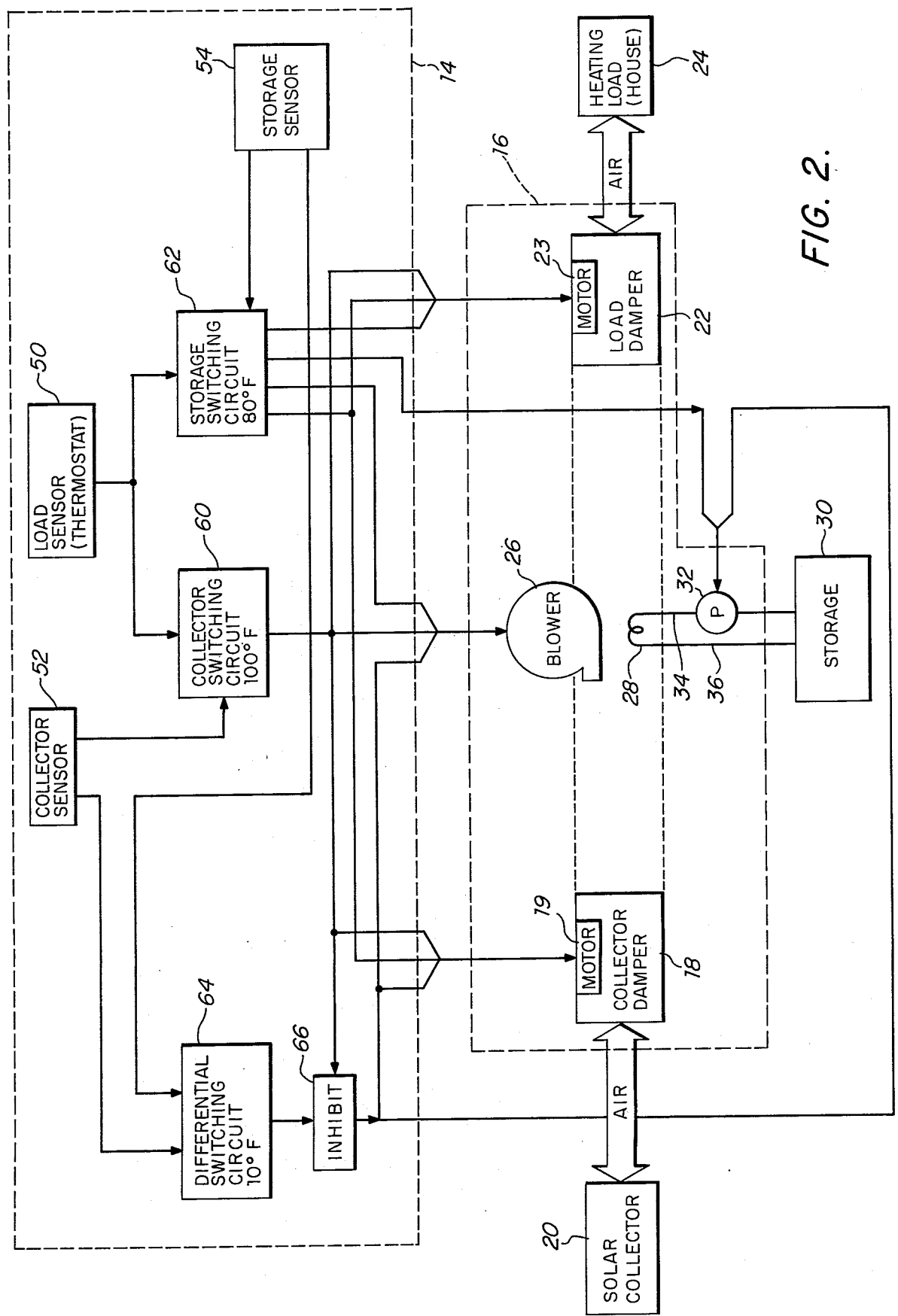
FIG. 2 is an enlarged, detailed block diagram of the heat transfer control unit and control circuit of FIG. 1.

The operation of control circuit 14 and heat transfer control unit 16 may be better understood with reference to FIG. 2. Throughout the description of the figures, like parts have been given like numbers and similar parts like numbers accompanied by a successive lower case letter beginning with $a$.

In FIG. 2, collector damper 18 includes a driving motor or solenoid 19 to electrically operate the damper, and load or house damper 22 similarly includes motor or solenoid 23 to operate it. Each of these solenoids responds to signals from control circuit 14 which includes, in addition to load or house sensor or thermostat 50, collector sensor 52 and storage sensor 54, a collector switching circuit 60, storage switching circuit 62, and differential switching circuit 64 and an inhibit circuit 66, which controls the output of differential switching circuit 64.

Thermostat 50 responds to the temperature in house 24 and provides a signal to collector switching circuit 60 and storage switching circuit 62 whenever the temperature in house 24 goes below a preset level. Storage sensor 54 monitors the temperature in storage 30 and provides a signal representative of that temperature to storage switching circuit 62. Similarly, collector sensor 52 monitors the temperature in solar collector 20 and delivers a signal representative of that temperature to collector switching circuit 60. Differential switching circuit 64 responds to the temperature signals from both storage sensor 54 and collector sensor 52, and provides an output when the differential between those two temperatures is equal to or in excess of some predetermined value.

In this specific embodiment, storage switching circuit 62 is operable upon receiving a signal from storage sensor 54 indicating that storage 30 is at or above a preset level. Collector switching circuit 60 is operative upon receiving a signal from collector sensor 52 that the temperature of solar collector 20 is at or above a preset level. Differential switching circuit 64 is operative upon receiving signals from collector sensor 52 and storage sensor 54 indicating that the temperature of solar collector 20 is at least 10° F or higher than that of storage 30.

In operation, when the house or the heating load 24 requires heat as indicated by thermostat 50, a signal is provided to both collector switching circuit 60 and storage switching circuit 62. If collector switching circuit 60 is at or above a preset temperature, it immediately sends out a signal to inhibit circuit 66, which prevents any output from differential switching circuit 64, even though at this point the difference in temperature between the collector 20 and storage 30 is well above its preset level. Collector switching circuit 60 at this time also provides signals to solenoid 19 to open collector damper 18 to energize blower 26, and to solenoid 23 to open load damper 22. Cold air from the house 24 now is moved through load damper 22, then collector damper 18 to solar collector 20 and, after being heated, is returned through collector damper 18, load damper 22 to heat house 24. When the signal for increased heat for the house is signalled by thermostat 50 and collector switching circuit 60 is not operative, storage switching circuit 62 will operate, if adequately warm, by energizing solenoid 23 to open damper 22, energizing pump 32 to pump warm fluid from storage 30 through heat exchanger 28, energizing solenoid 19 to close collector damper 18, and energizing blower 26 to begin to move the cold air from house 24 through heat exchanger 28 and back into house 24 without submission to solar collector 20. If during this period it occurs that the differential in temperature between collector 20 and storage 30 is 10° F or more, the output of differential switching circuit 64, now unsuppressed by inhibit circuit 66 since collector switching circuit 60 is not operative, is free to operate solenoid 19 to open collector damper 18 and cause the cold air from house 24 to be moved through load damper 22 and then to collector damper 18 to be preheated by solar collector 20 at some intermediate temperature, and then finally heated by heat exchanger 28 and returned to damper 22 to heat house 24.

In the event that house 24 requires no heat and thus thermostat 50 is providing no enabling signals to collector switching circuit 60 and storage switching circuit 62, differential switching circuit 64 operates to increase and maintain the heat stored in storage 30. Thus with collector switching circuit 60 and storage switching circuit 62 inoperative in the absence of the signal from thermostat 50, differential switching circuit 64, when it senses a preset differential between solar collector 20 and storage 30, provides an output signal which operates solenoid 19 to open collector damper 18 and operates solenoid 23 to close load damper 22 and simultaneously provides signals to turn on blower 26 and pump 32. In this mode of operation, blower 26 moves hot air from solar collector 20 externally through heat exchanger 28, which at the same time through the operation of pump 32 is internally receiving water from storage 30. In this way, differential switching circuit 64 operates to increase and maintain the heat in storage 30 when house 24 does not directly require the heat. It also operates to utilize otherwise wasted heat energy in solar collector 20 when the temperature of solar collector 20 is higher than the temperature of storage 30 but yet is not high enough to warrant direct heating of air to warm the load. Under these circumstances, differential switching circuit 64 sees to it that this lower level of heat generated from solar collector 20 is not wasted but is utilized at least to preheat the air before it is submitted to heat exchanger 28 for its final heat increase before being returned to heat house 24.

Figure 3:
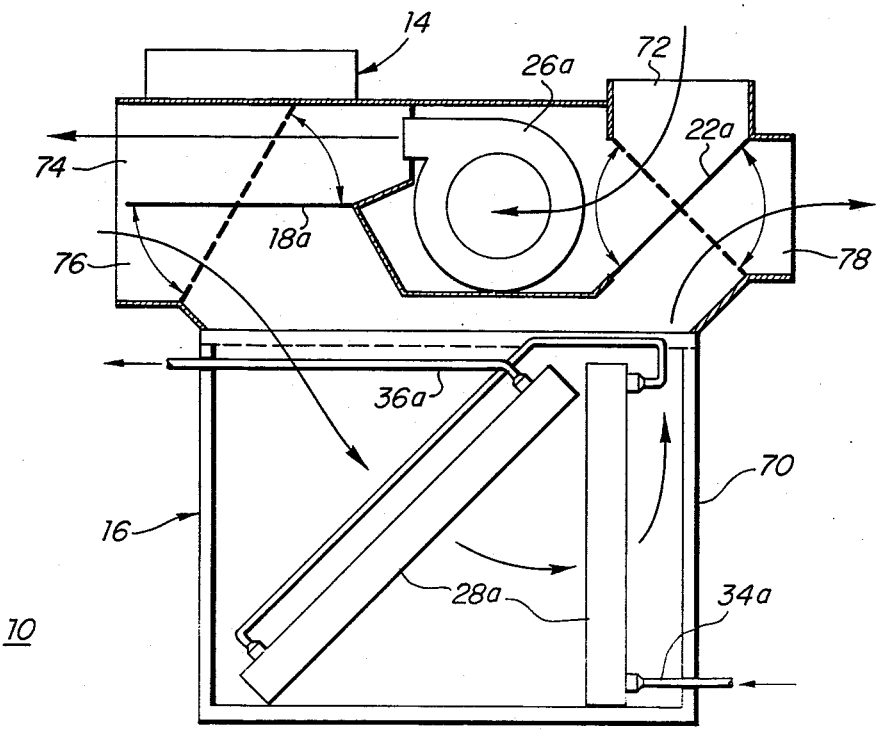
FIG. 3 is a diagrammatic sectional view of a heat transfer control unit shown in claim 1.

The heat transfer control unit 16 as shown in more detail in FIG. 3, where it can be seen that within one housing 70, there is included a two-part heat exchanger 28a, connected to the inlet pipe 34a and outlet pipe 36a, blower 26a, house damper 22a and collector damper 18a, each of which are in the open position. The dashed lines indicate the alternate closed position of each of those dampers. Control circuit 14 may be located with or remote from housing 70. The path of the air through heat transfer control unit 16 is shown by the arrows. Cold air from the house enters port 72, is drawn into blower 26a, and blown out through port 74 to the collector. Returning from the collector, the heated air enters port 76, moves through heat exchanger 28a and then up against damper 22a and out port 78 on its return to house 24.

Other embodiments will occur to those skilled in the art and are within the following claims:

What is claimed is:

1. A control circuit for a solar heating system having a solar collector, a heating load and a heat transfer control unit including a collector valve for controlling the flow of heating fluid to and from a solar collector; a load valve for controlling the flow of heating fluid to and from a heating load; a heating pump for moving the heating fluid; a heat exchanger; and a storage pump for circulating a storage fluid from a storage tank through said heat exchanger; said control circuit comprising:
   a load sensor for sensing the temperature of the load;
   a collector sensor for sensing the temperature of the solar collector;
   a collector switching circuit responsive to an indication from said load sensor that the load temperature is below a preset level and from said collector sensor that the collector temperature is above a predetermined level, to open said valves and actuate said heating pump to move the heating fluid from the load to the collector to be heated and then returned to the load;
   a storage sensor for sensing the temperature of the storage fluid in the storage tank;
   a storage switching circuit responsive to an indication from said load sensor that the load temperature is below a preset level and from said storage sensor that the storage fluid temperature is above a predetermined level to open said load valve, close said collector valve, actuate said storage pump to move said storage fluid internally through said heat exchanger, and actuate said heating pump to move the heating fluid for the load externally through said heat exchanger to be heated and then returned to the load; and
   a differential switching circuit, responsive to said storage sensor and said collector sensor, upon a preestablished minimum differential between said collector temperature and said storage fluid temperature, when said collector switching circuit and said storage switching circuit are inoperative in the absence of an indication from said load sensor, for actuating said storage pump to move said storage fluid internally through said heat exchanger, opening said collector valve and closing said load valve, and activating said heating pump for moving the heating fluid from the collector externally through said heat exchanger to increase the heat stored in said storage fluid and, when said storage switching circuit is operative, to open said collector valve and activate said storage pump to preheat the heating fluid coming from said load before it reaches said heat exchanger.

2. A solar heating control system comprising:
a heat transfer control unit including:
a collector valve for controlling the flow of heating fluid to and from a solar collector;
a load valve for controlling the flow of heating fluid to and from a heating load;
a heating pump for moving the heating fluid;
a heat exchanger;
a storage pump for circulating a storage fluid from a storage tank through said heat exchanger;
a control circuit including:
a load sensor for sensing the temperature of the load;
a collector sensor for sensing the temperature of the solar collector;
a collector switching circuit responsive to an indication from said load sensor that the load temperature is below a preset level and from said collector sensor that the collector temperature is above a predetermined level, to open said valves and actuate said heating pump to move the heating fluid from the load to the collector to be heated and then returned to the load;
a storage switching circuit responsive to an indication from said load sensor that the load temperature is below a preset level and from said storage sensor that the storage fluid temperature is above a predetermined level to open said load valve, close said collector valve, actuate said storage pump to move said storage fluid internally through said heat exchanger, and actuate said heating pump to move the heating fluid for the load externally through said heat exchanger to be heated and then returned to the load; and
a differential switching circuit, responsive to said storage sensor and said collector sensor, upon a preestablished minimum differential between said collector temperature and said storage fluid temperature, when said collector switching circuit and said storage switching circuit are inoperative in the absence of an indication from said load sensor, for actuating said storage pump to move said storage fluid internally through said heat exchanger, opening said collector valve and closing said load damper, and activating said heating pump for moving the heating fluid from the collector externally through said heat exchanger to increase the heat stored in said storage fluid and, when said storage switching circuit is operative, to open said collector valve and activate said storage pump to preheat the heating fluid coming from said load before it reaches said heat exchanger.

* * * * *